Oct. 1, 1963

J. MAURUSHAT, JR

AUTOMATIC TEST EQUIPMENT FOR CARRIER TYPE COMMUNICATION SYSTEMS 3,105,881

Filed Dec. 20, 1961

3 Sheets-Sheet 1

INVENTOR

J. MAURUSHAT, JR.

BY

ATTORNEY

INVENTOR
J. MAURUSHAT, JR.
BY
ATTORNEY

Oct. 1, 1963

J. MAURUSHAT, JR

AUTOMATIC TEST EQUIPMENT FOR CARRIER TYPE COMMUNICATION SYSTEMS 3,105,881

Filed Dec. 20, 1961

3 Sheets-Sheet 3

INVENTOR
J. MAURUSHAT, JR.

BY H. L. Logan

ATTORNEY

United States Patent Office 3,105,881
Patented Oct. 1, 1963

3,105,881
AUTOMATIC TEST EQUIPMENT FOR CARRIER TYPE COMMUNICATION SYSTEMS

Joseph Maurushat, Jr., Millburn, N.J., assignor to Bell Telephone Laboratories, Incorporated, New York, N.Y., a corporation of New York Filed Dec. 20, 1961, Ser. No. 160,739
4 Claims. (Cl. 179—175)

Figure 1:
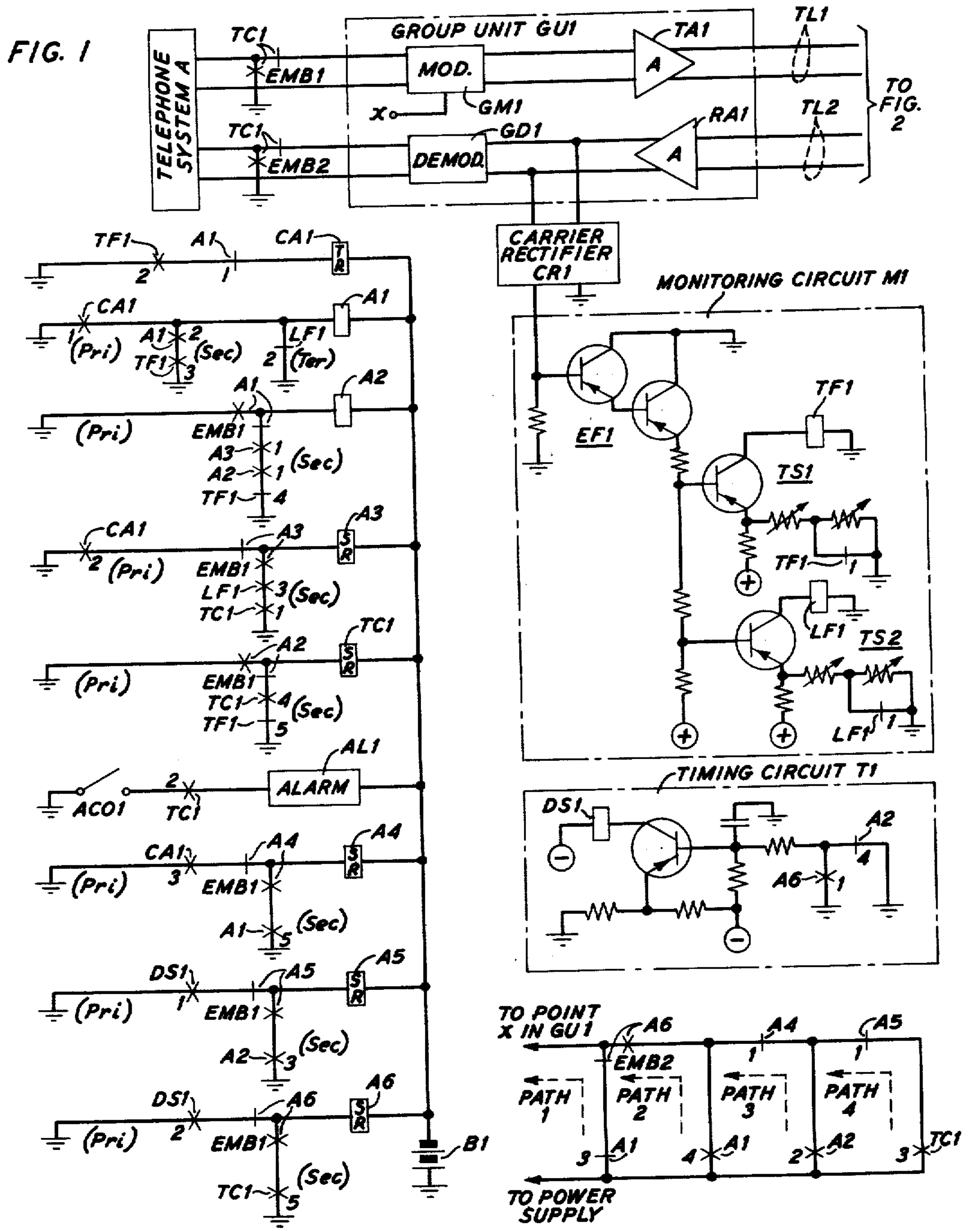

This invention relates to control equipment and in particular to equipment which automtically removes a carrier-type communication system from service when transmission trouble, that adversely affects transmission, occurs and automatically returns the system to service when the trouble is no longer present.

It is frequently desirable to automatically remove a carrier-type communication system from service when transmission trouble that adversely affects service occurs and to automatically return the system to service when the trouble is corrected. Systems having control equipments that perform these functions are disclosed in United States Patent No. 2,986,610, issued to J. Maurushat, Jr., on May 30, 1961, and in application Serial No. 134,683, filed jointly by J. Maurushat, Jr., and N. A. Newell on April 26, 1960. Each of these equipments relies on supervisory signaling equipment inherent in the system to effect testing and signaling between the terminals. Because of this, they cannot be used in systems not having supervisory signaling equipment unless some form of signaling equipment is added along with the control equipment. Adding such signaling equipment, however, is not always desirable from a cost and maintenance standpoint.

An object of the present invention is to automatically remove a carrier-type communication system from service upon the occurrence of transmission trouble that adversely affects service and to automatically return the system to service when the trouble is corrected without using either supervisory signaling equipment inherent in the system or additional signaling equipment.

This and other objects are achieved in accordance with the present invention by removing each terminal of a carrier-type transmission system from service when a failure that adversely affects transmission to that terminal occurs, turning each terminal's carrier wave off and on to effect transmission testing and signaling with the other terminal and returning both terminals to service upon the clearance of the failure.

In one of the broader aspects of the invention, the carrier-frequency currents in the receiving channel of each terminal of a carrier-type transmission system are monitored. When the monitored current of a terminal deviates from a predetermined level for a predetermined interval, the terminal is removed from service and its carrier wave is interrupted. When, therefore, an adverse transmission failure occurs in only one transmission direction, the terminal affected is removed from service and has its carrier wave interrupted. This carrier wave interruption is recognized by the other terminal as a transmission failure with the result that the other terminal is removed from service and produces a carrier wave interruption. This latter carrier wave interruption is not, however, recognized by the first terminal because of the failure in transmission in that direction. Simultaneous transmission failures in both directions, on the other hand, cause both terminals to be removed from service and to produce interruptions in their carrier waves. These carrier wave interruptions are ineffectual at the opposite terminals because of the loss of transmission between the terminals.

In accordance with the invention, after both of the terminals have been removed from service and they are again producing carrier waves, the carrier wave produced by each terminal is momentarily interrupted when the monitored current of its terminal is again substantially at the predetermined level. When the terminals do not include automatic gain controlled (AGC) amplifiers in their receiving channels, the return of a monitored current to substantially its predetermined level is indicative that its terminal is receiving the other terminal's carrier wave. Most carrier terminals, however, include AGC amplifiers in their receiving channels. When AGC amplifiers are present it is possible for the gain of such an amplifier to increase during the time of a failure to the point where carrier-frequency components in the noise, crosstalk and other signals in its output are sufficient to cause the monitored current to be at substantially the aforementioned predetermined level, thereby giving a false indication that the failure has cleared. In view of this possibility, the return of the monitored currents to substantially their predetermined levels is not used as an indication that the system is ready to be returned to service.

In further accordance with the invention, each terminal produces a second momentary carrier interruption when its monitored current decreases from one level to another level where one of the levels is substantially the previously mentioned predetermined level. These changes are produced by either the reception of off-on carrier signals or the re-establishment of the gains of AGC amplifiers after the clearance of transmission failures. In either case, such a change is indicative that the terminal is ready to be returned to service. The last-produced of these second momentary carrier interruptions is therefore an indication that the system is ready to be put back into service.

In still further accordance with the invention, each terminal produces a third momentary carrier interruption and reconnects the terminal to service when its monitored current momentarily decreases. The first terminal to produce a third momentary carrier interruption and reconnect itself to service does so in response to the last-produced of the second momentary carrier interruptions. The third momentary interruption produced by this terminal is received by the other terminal which in turn produces a third momentary carrier interruption and reconnects itself to service. This last-produced carrier interruption is received by the other terminal but does not affect the operation of the system. The system is now back in operation.

As will become apparent from the following discussion relating to an embodiment of the invention, embodiments of the invention respond to failures in either direction of transmission or to failures which occur simultaneously in both directions of transmission. Furthermore, these embodiments respond to failures of any duration that adversely affect transmission.

Figure 2:
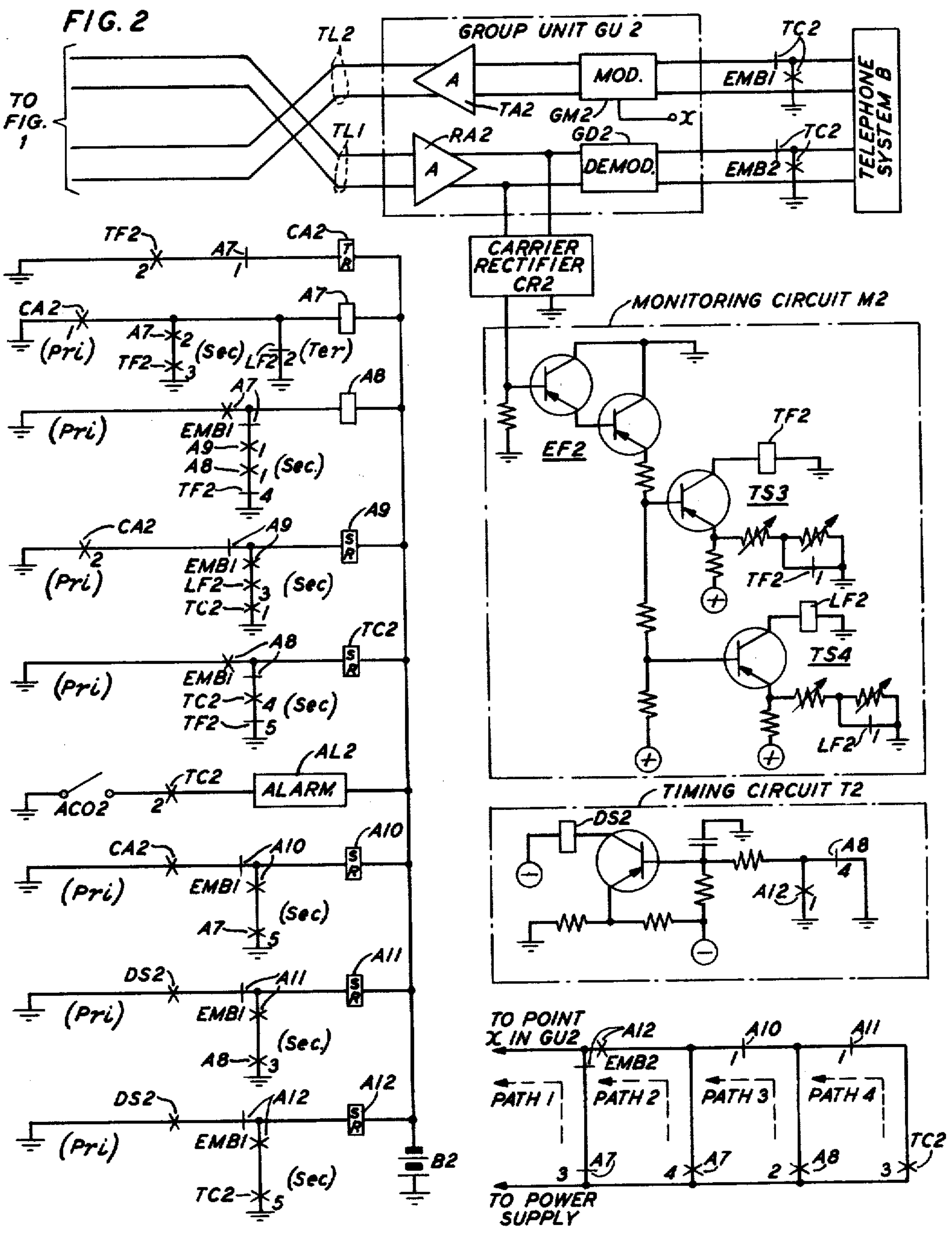
Figure 3:
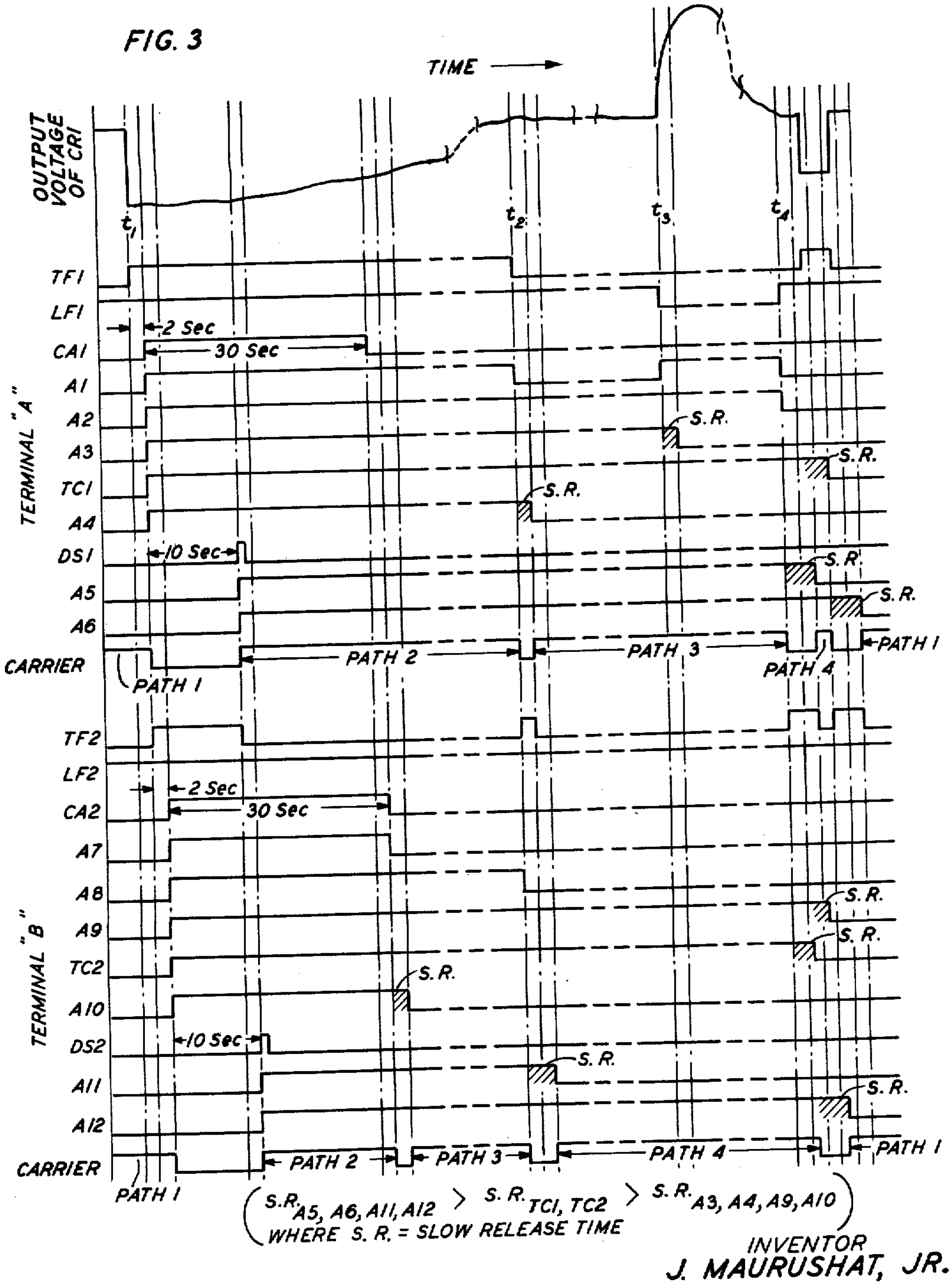

In the drawings:

FIGS. 1 and 2 illustrate an embodiment of the invention in block and schematic form; and FIG. 3 is a group of curves to facilitate an understanding of the operation of the embodiment of FIGS. 1 and 2.

Terminals of a carrier-type communications system embodying the invention are illustrated, in block and schematic form, in FIGS. 1 and 2, respectively. For a better understanding of the following description, FIGS. 1 and 2 may be placed adjacent to one another so that FIG. 2 is on the right-hand side of FIG. 1. Furthermore, when studying the following description, it should be noted that relay contacts are shown in detached form with an "X" indicating a "make" contact and a bar indicating a "break" contact. The principles of this type of notation are described in an article, entitled "An Improved Detached-Contact-Type of Schematic Circuit Drawing," by F. T. Meyer in the September 1955 publication of transactions of the American Institute of Electrical Engineers, "Communications and Electronics," volume 74, part I pages 505–513.

SYSTEM DESCRIPTION

The terminals shown in FIGS. 1 and 2 are identical to one another. The terminal of FIG. 1 comprises a telephone system A, a group unit GU1 and control equipment, while the terminal of FIG. 2 comprises a telephone system B, a group unit GU2 and control equipment. Telephone systems A and B are conventional and may, for example, be multichannel arrangements. The various circuits of group units GU1 and GU2 are also conventional. In view of this, telephone systems A and B and the circuits of the group units are shown in block diagram form and are not discussed in detail unless considered necessary for a better understanding of the invention.

When operating normally, the output from telephone system A is applied to group unit GU1 where it modulates a carrier wave in a modulator GM1. The output of modulator GM1 is amplified by an amplifier TA1 and transmitted over a transmission line TL1 to the terminal of FIG. 2. The carrier wave arriving at the terminal of FIG. 2 is applied to group unit GU2 where it is amplified by an amplifier RA2 and demodulated by a demodulator GD2. The demodulated output of group unit GU2 is applied to telephone system B. In a similar manner, the output from telephone system B is applied to group unit GU2 where it modulates a carrier wave in a modulator GM2. The output from modulator GM2 is amplified by an amplifier TA2 and transmitted over a transmission line TL2 to the terminal of FIG. 1. The carrier wave arriving at the terminal of FIG. 1 is applied to group unit GU1 where it is amplified by an amplifier RA1 and demodulated by a demodulator GD1. The demodulated output of group unit GU1 is applied to telephone system A.

In systems of the above described type, the average levels of the carrier waves received at the terminals may undergo gradual or slow changes. These changes may be produced by gradual changes occuring in the equipment as, for example, a change in the transmission line loss because of a temperature change. In order to compensate for such changes in the average levels of the received carrier waves and thereby maintain normal transmission, amplifiers RA1 and RA2 are automatic gain control (AGC) amplifiers. The maximum rates at which the gains of these amplifiers change are, however, relatively low so that the amplifiers compensate for gradual changes and not momentary changes of the received carrier waves. In typical systems, each of these amplifiers may require at least twenty minutes to change from minimum gain to maximum gain.

The control equipments of the terminals of FIGS. 1 and 2 are now considered in detail.

A carrier rectifier CR1 is connected to the output of amplifier RA1 while a carrier rectifier CR2 is connected to the output of amplifier RA2. These carrier rectifiers are conventional circuits which are provided for selecting, rectifying and filtering the carrier wave outputs of amplifiers RA1 and RA2. Although the first curve of FIG. 3 is considered subsequently in discussing the operation of the illustrated embodiment when a transmission failure occurs, reference to this curve at this time may help in understanding the operation of the carrier rectifiers. The first curve of FIG. 3 represents what happens to the direct current (D.C.) voltage output of carrier rectifier CR1 when a relatively long time failure in transmission from the terminal of FIG. 2 to the terminal of FIG. 1 occurs. The line curve to the left of, i.e., prior to, time $t_1$ represents the output level of carrier rectifier CR1 for normal transmission. At time $t_1$ a transmission failure occurs. Noise, crosstalk and other signals which may be present in the amplifier output and which contain components simulating the carrier wave are still applied to carrier rectifier CR1. These components are selected, rectified and filtered by carrier rectifier CR1. Because these components are small compared to the carrier wave prior to the time of failure, the output of carrier rectifier CR1 decreases. Between times $t_1$ and $t_2$ (which may be as long as twenty minutes), the gain of AGC amplifier RA1 is increasing. As the gain of this amplifier increases, the levels of the noise, crosstalk and other signals which may be present in its output also increase with the resulting increase in the output of carrier rectifier CR1. Between times $t_2$ and $t_3$, the gain of amplifier RA1 is at a level where the noise, crosstalk and other signals that may be present in the output of the amplifier are sufficient to cause the output of carrier rectifier CR1 to be at the level at which it is during normal transmission. At time $t_3$ the carrier wave is again received and the output of carrier rectifier CR1 increases because of the high gain of amplifier RA1. Between times $t_3$ and $t_4$ the gain of amplifier RA1 is automatically readjusting itself for normal transmission. Subsequent to time $t_4$ the carrier wave is momentarily interrupted as part of a signaling program, to be described, to put the system back in service.

The output of carrier rectifier CR1 is applied to a monitoring circuit M1 while the output of carrier rectifier CR2 is applied to a monitoring circuit M2. These monitoring circuits are identical to circuits disclosed in FIGS. 2 and 4 of the previously mentioned Patent 2,986,610. Because these circuits are described in detail in this previously mentioned patent, they are only briefly discussed at this time.

The inputs of the monitoring circuits M1 and M2 include emitter followers EF1 and EF2, respectively, for isolation purposes. Emitter follower EF1 drives a pair of transistor switches TS1 and TS2 while emitter follower EF2 drives a pair of transistor switches TS3 and TS4. Each of these switches controls a relay. In the terminal of FIG. 1 these relays are identified as temporary failure relay TF1 and long term failure relay LF1, while in the terminal of FIG. 2 they are identified as temporary failure relay TF2 and long term failure relay LF2. Each of these relays has a break contact 1 in its transistor switch circuit to effect an increase in the relay's holding current. The biasing controls of the relay transistor switches are adjusted so that when the system is operating in a normal manner, temporary failure relays TF1 and TF2 are in their released states while long term failure relays LF1 and LF2 are in their operated states. Temporary failure relays TF1 and TF2 are operated when the outputs from their respective carrier rectifiers fall below the normal transmission levels while long term failure relays LF1 and LF2 release when the outputs from their respective carrier rectifiers rise above their normal output levels.

The control equipment of the terminal of FIG. 1 also includes a plurality of relays CA1, A1 through A6 and TC1. One lead from each of these relays is connected to the negative terminal of a battery source B1 whose positive terminal is returned to a point of ground potential. The remaining lead from each of these relays is connected to ground by way of one or more energizing paths.

Also connected between the negative terminal of source B1 and ground of FIG. 1 is an alarm AL1. Alarm AL1 may include bells, lights or other indicating means.

The control equipment of FIG. 1 also includes a timing circuit T1 and a four-path energizing circuit connected between an unillustrated power source and modulator GM1. Timing circuit T1 includes a relay DS1 and is substantially identical to the timing circuits disclosed in FIGS. 2 and 4 of the previously mentioned Patent 2,986,610. Because the timing circuit is fully described in this previously mentioned patent, it is not discussed in detail herein.

The control equipment of the terminal of FIG. 2 is identical to that of FIG. 1 and includes relays CA2, A7 through A12 and TC2, an alarm AL2, a battery source B2 for energizing these relays and alarm, a timing circuit T1 which includes a relay DS2 and a four-path power supply circuit.

Relays A3 through A6, TC1, A9 through A12 and TC2 are all slow release relays. The slow release times of relays A5, A6, A11 and A12 are greater than the slow release times of relays TC1 and TC2, which in turn are greater than the slow release times of relays A3, A4, A9 and A10.

Under normal operating conditions, the only relays in the control equipments that are in operated states are relays LF1 and LF2. Furthermore, modulators GM1 and GM2 are energized via path 1 of their respective power supply circuits.

The operation of the control equipments for transmission failures is now discussed in detail for failures of three different durations.

TRANSMISSION FAILURE OF A FIRST DURATION

Assume that a failure from the terminal of FIG. 2 to the terminal of FIG. 1 occurs and that this failure lasts sufficiently long for the gain of AGC amplifier RA1 to increase to the level where the noise, crosstalk and other signals appearing in its output are of sufficient amplitude for the output of the carrier rectifier CR1 to be at the level at which it is when the system is transmitting in a normal manner. The operation of the system, when such a failure occurs, is explained in conjunction with the various graphs shown in FIG. 3.

As previously discussed, the uppermost graph in FIG. 3 represents the output of carrier rectifier CR1 for the above described type of failure. Below this graph and in time alignment therewith are graphs for each of the relays to illustrate their conditions or states at times corresponding to the output of carrier rectifier CR1. In each of the graphs representing the conditions of the relays, the line in its uppermost position is an indication that the relay is in its operated state while the line in its lowermost position is an indication that the relay is in its released state. Also shown are graphs indicating whether or not the modulators are energized. When the lines are in their uppermost conditions, the modulators are producing carrier waves; when the lines are in their lowermost conditions, the modulators are not producing carrier waves.

*Section 1A*

Prior to time $t_1$ of FIG. 3, the system of FIGS. 1 and 2 is operating in a normal condition. The output of carrier rectifier CR1, as represented by the first graph in FIG. 3, is therefore at a normal level. In this condition of operation, relays LF1 and LF2 are in their operated states while the remaining relays in the terminals are in their released states. Furthermore, at this time modulator GM1 is energized via path 1 of its power supply circuit while modulator GM2 is energized via path 1 of its power supply circuit.

At time $t_1$, a failure in transmission from the terminal of FIG. 2 to the terminal of FIG. 1 occurs. When this failure occurs, the output of carrier rectifier CR1 falls below its normal output level and temporary failure relay TF1 is operated. Relay TF1 make contact 2 in the energizing path of carrier alarm relay CA1 is closed and relay CA1 is energized. Relays CA1 and CA2 are thermal relays which operate approximately two seconds after being energized and release about thirty seconds after being de-energized. These relays prohibit the system from being removed from service when a failure clears within two seconds after it occurs. As the present failure is assumed to be greater than two seconds, relay CA1 operates approximately two seconds after being energized and its make contacts 1, 2 and 3 in the primary energizing paths of relays A1, A3 and A4, respectively, are closed, thus causing these three relays to operate. Once operated, relay A1 remains operated because relay CA1 make contact 1 is closed in its primary energizing path and relay A1 make contact 2 and relay TF1 make contact 3 are closed in its secondary energizing path.

When relay A1 operates, its early make-break contacts EMB1 in the primary and secondary energizing paths of relay A2 are operated and relay A2 is operated and held operated as a result of its primary energizing path being closed. When relay A2 operates, its early make-break contacts EMB1 in the primary and secondary energizing paths of relay TC1 are operated and relay TC1 is operated and held operated via its primary energizing path. Alarm AL1 is energized when relay TC1 operates. This alarm may be turned off by switch ACO1.

Returning to relay A3, this relay when once operated is held operated by its secondary energizing path. In particular, early make-break contacts EMB1 of relay A3 are now open in its primary energizing path and closed in its secondary energizing path. The secondary energizing path of relay A3 also includes closed make contact 3 of relay LF1 and closed make contact 1 of relay TC1 to complete the circuit through this path.

Returning to relay A4, when this relay operates, a pair of early make-break contacts EMB1 of relay A4 are opened in its primary energizing path while closed in its secondary energizing path. The secondary energizing path of relay A4 also includes a closed make contact 5 of relay A1 to complete the circuit through this path. Relay A4 therefore remains locked in an operated state via its secondary energizing path.

To summarize, two seconds after time $t_1$, relays TF1, LF1, CA1, A1, A2, A3, TC1 and A4 are all in operated states.

When relay TC1 is operated and held operated, the terminal of FIG. 1 is disconnected from service and made to appear busy by the early make-break contacts EMB1 and EMB2 of relay TC1. Furthermore, when relay A1 is operated and held operated, its break contact 3 in path 1 of the power supply circuit is opened so that modulator GM1 is no longer energized and the carrier produced by the terminal of FIG. 1 is cut off.

When the carrier of the terminal of FIG. 1 is cut off, this appears as a failure at the terminal of FIG. 2 and relay TF2 is operated. Two seconds after relay TF2 operates, relay CA2 operates and relays A7 through A10 and TC2 are caused to operate and remain operated in a manner identical to relays A1 through A4 and TC1, respectively, of the terminal of FIG. 1.

When relay TC2 operates and is held operated, the terminal of FIG. 2 is removed from service and made to appear busy by its early make-break contacts EMB1 and EMB2. The operation of relay A7 opens its break contact 3 in path 1 of the power supply circuit of the terminal of FIG. 2, thus turning off the carrier produced by this terminal. Since there is a transmission failure from the terminal of FIG. 2 to the terminal of FIG. 1, cutting off the carrier at the terminal of FIG. 2 at this time does not affect the terminal of FIG. 1.

At this time, both terminals have been removed from service and path 1 of each power supply circuit has been opened so that neither modulator is operating.

Approximately ten seconds after relay CA1 is operated relay DS1 is caused to operate. Relay DS1 is operated by timing circuit T1 whose timing operation is initiated by the opening of break contact 4 of relay A2. When relay DS1 operates, its make contacts 1 and 2 in the primary energizing paths of relays A5 and A6, respectively, are closed, thus causing relays A5 and A6 to operate.

The primary energizing path of relay A5 includes a break contact while the secondary energizing path includes a make contact of a pair of early make-break contacts EMB1 of relay A5. The secondary energizing path of relay A5 also includes a make contact 3 of relay A2 which contact is now in a closed state. In view of this, when relay A5 is operated, its early make-break contacts EMB1 cause the primary energizing path of the relay to be opened and the secondary energizing path of the relay to be closed, thus holding the relay operated by way of its secondary energizing path.

Referring to relay A6, its primary energizing path includes a break contact while its secondary energizing path includes a make contact of a pair of early make-break contacts EMB1 of relay A6. The secondary energizing path of relay A6 also includes a make contact 5 of relay TC1 which contact is now in a closed state. As the result of relay A6 operating, the primary energizing path of this relay is opened while its secondary energizing path is closed, thus holding relay A6 in an operated state.

When relay A6 operates, relay DS1 is released as a result of the closing of make contact 1 of relay A6 in timing circuit T1.

Referring to paths 1 and 2 of the supply circuit of the terminal of FIG. 1, it will be noted that path 1 includes a break contact while path 2 includes a make contact of a pair of early make-break contacts EMB2 of relay A6. Furthermore, it will be noted that path 2 includes a make contact 4 of relay A1. Contact 4 of relay A1 is in a closed condition at this time as a result of relay A1 being operated. When relay A6 is operated, its early make-break contacts EMB2 open in path 1 and close in path 2. As a result of this action, modulator GM1 is again energized and the terminal of FIG. 1 transmits a carrier to the terminal of FIG. 2 because transmission in this direction is not impaired.

When the carrier of the terminal of FIG. 1 is turned on, relay TF2 of the terminal of FIG. 2 releases because the transmission between the terminal of FIG. 1 and the terminal of FIG. 2 is not impaired. When relay TF2 releases, its make contact 3 in the secondary energizing path of relay A7 is opened. Relay A7, however, is held operated as a result of closed contact 1 of relay CA2 in its primary energizing path. Further response to the carrier from the terminal of FIG. 1 is prevented until relay CA2 has completed its timing cycle.

Approximately ten seconds after relay CA2 operates, relay DS2 operates and causes relay A11 and A12 to operate via their primary energizing paths. In a manner similar to that by which relays A5 and A6 of the terminal of FIG. 1 locked operated, these two relays lock operated. Furthermore, when relay A12 is operated, relay DS2 is released as a result of make contact 1 of relay A12 in timing circuit T2 being closed.

The operation of relay A12 produces another effect. Referring to the power supply circuit for the control equipment of the terminal of FIG. 2, it will be noted that path 1 includes a break contact 3 of relay A7 which contact is now in its open state and that path 2 includes a make contact 4 of relay A7 which contact is now in its closed state. Path 1 also includes a break contact while path 2 includes a make contact of a pair of early make-break contacts EMB2 of relay A12. In view of this, when relay A12 is operated, path 2 is closed so that the carrier of the terminal of FIG. 2 is again turned on. The carrier of the terminal of FIG. 2 does not, however, get to the terminal of FIG. 1 because of the failure in transmission from the terminal of FIG. 2 to the terminal of FIG. 1.

To summarize, each of the control equipments has thus far responded to a deviation in the output from its terminal's receiving amplifier to remove the terminal from service and to interrupt its carrier for approximately ten seconds.

*Section 1B*

About thirty seconds after relay CA1 is operated, relay CA1 releases. (As mentioned previously, relays CA1 and CA2 are thermal relays which take about two seconds to operate after being energized and about thirty seconds to release after being de-energized. Relays CA1 and CA2 are de-energized shortly after operating as a result of relays A1 and A7 being operated.) When relay CA1 releases, the primary energizing path of relay A1 is opened but relay A1 remains operated via its secondary energizing path. Relay A1 is now conditioned to release when relay TF1 releases.

About thirty seconds after relay CA2 is operated, it releases which causes relay A7 to release. (It will be noted that at this time the carrier from the terminal of FIG. 1 is being received by the terminal of FIG. 2. Relay TF2 is therefore in its released state with its make contact 3 in the secondary energizing path of relay A7 in its open state. Relay A7 is therefore not held in an operated state by the secondary energizing path as is relay A1 of the terminal of FIG. 1.) When relay A7 releases, make contact 4 of relay A7 in path 2 of the power supply circuit is opened so that the carrier of the terminal of FIG. 2 is again turned off. Furthermore, when relay A7 releases, relay A10 is de-energized while relay A8 is held operated by its secondary energizing path. Relay A10 is a slow release relay which releases shortly after being de-energized. Path 3 of the power supply circuit of FIG. 2 includes a closed make contact 2 of relay A8 and a break contact 1 of relay A10 which is closed when relay A10 releases. The carrier of the terminal of FIG. 2 is therefore again turned on. This, however, still does not have any effect on the terminal of FIG. 1 because the failure from the terminal of FIG. 2 to the terminal of FIG. 1 still exists.

At the time $t_2$, the gain of amplifier RA1 has increased to the point where noise, crosstalk or other signals in its output cause the output of carrier rectifier CR1 to appear at the level at which it appears for normal carrier reception. At this time relay TF1 releases, which in turn causes relay A1 to release because of make contact 3 of relay TF1 in the secondary energizing path of relay A1. When relay A1 releases, relay A4 is de-energized because of the opening of make contact 5 of relay A1 in its secondary energizing path. Relay A4 is, however, a slow release relay so it does not release until a short period after it has been de-energized.

When relay A1 releases, its make contact 4 in path 2 of the power supply circuit of FIG. 1 is opened and the carrier of the terminal of FIG. 1 is turned off. Shortly thereafter relay A4 releases which causes its break contact 1 in path 3 of this power supply circuit to close. Path 3 also includes a closed make contact 2 of relay A2. As a result of the closing of the break contact 1 of relay A4, path 3 is closed and the carrier of the terminal of FIG. 1 is again turned on.

In summary, the action described in this section results in each terminal producing a momentary interruption in its carrier wave when the output of the terminal's receiver-amplifier approximates a normal output level subsequent to thirty seconds after the terminal has been removed from service.

*Section 1C*

The momentary interruption of the carrier of the terminal of FIG. 1 causes relay TF2 of the terminal of FIG. 2 to be operated and released. When relay TF2 is operated, its break contact 4 in the secondary energizing path of relay A8 is opened which causes relay A8 to release and in turn its make contact 1, also in the secondary energizing path, to open. When, therefore, relay TF2 is again released, relay A8 remains in a released state. Furthermore, when relay A8 releases, its make contact 3 in the secondary energizing path of relay A11 is opened so that relay A11 is de-energized. Relay A11 is, however, a slow release relay so that it does not release until a short period after being de-energized. (The release time of relay A11 is greater than that of relay A10.

Although this greater release time is not required at this time, its purpose is explained subsequently with respect to the operation of its corresponding relay in the terminal of FIG. 1.)

The release of relay A8 causes its make contact 2 in path 3 of the power supply circuit of FIG. 2 to open so that the carrier of the terminal of FIG. 2 is turned off. When relay A11 releases shortly after the release of relay A8, break contact 1 of relay A11 in path 4 is closed. Make contact 3 of relay TC2 also in path 4 is closed at this time. Path 4 is therefore closed and the carrier of the terminal of FIG. 2 is again turned on. This, however, does not affect the terminal of FIG. 1 because the failure in transmission from the terminal of FIG. 2 to the terminal of FIG. 1 still exists.

At time $t_3$ the fault is cleared and the carrier of the terminal of FIG. 2 is received by the terminal of FIG. 1. Because of the high gain of amplifier RA1 at this time, carrier rectifier CR1 produces a large output signal which in turn causes relay LF1 to release. When relay LF1 releases, its break contact 2 in the tertiary energizing path of relay A1 causes relay A1 to operate while its make contact 3 in the secondary energizing path of relay A3 causes relay A3, which is a slow release relay, to be de-energized. Relay A3 has a release time approximately equal to those of relays A4 and A10. The operation of relay A1 closes the primary energizing path of relay A2 while the release of relay A3 opens its make contact 1 in the secondary energizing path of relay A2. This is a conditioning operation so that relay A2 will release after relay A1 releases at time $t_4$. This feature will be better understood subsequently when the operation of the circuitry at time $t_4$ is considered. Other than this conditioning operation, nothing else occurs at either terminal at time $t_3$.

At time $t_4$ the gain of amplifier RA1 has been reestablished and the trunk is now ready to be put back into operation. At this time, relay LF1 is caused to operate because the output from carrier rectifier CR1 has decreased to the output level occurring under normal transmission. When relay LF1 operates, relay A1 releases as a result of the tertiary energizing path of relay A1 being opened. Furthermore, relay A2 releases because of the opening of the make contact of the early make-break contacts EMB1 of relay A1 in the primary energizing path of relay A2. Relay TC1 is no longer held operated by its primary energizing path because of the opening of the make contact of early make-break contacts EMB1 of relay A2; relay TC1 is, however, held operated by its secondary energizing path which includes its closed make contact 4 and the open break contact 5 of relay TF1. The release of relay A2 also opens its make contact 3 in the secondary energizing path of relay A5. Relay A5 is, however, a slow release relay so it does not immediately release. The release of relay A2 causes path 3 of the power supply circuit of FIG. 2 to be opened because of the make contact 2 of relay A2 in this path. When relay A5 releases, path 4 is closed as a result of the closing of break contact 1 of relay A5. The carrier of the terminal of FIG. 1 is therefore momentarily interrupted.

In summary, the action described in this section results in each terminal producing another carrier wave interruption when the output of the receiver-amplifier of the terminal decreases from one level to another level where one of the levels is substantially the previously mentioned predetermined level.

*Section 1D*

When the off-on carrier signal from the terminal of FIG. 1 is received by the terminal of FIG. 2, relay TF2 is caused to operate and release. Opening break contact 5 of relay TF2 in the secondary energizing path of relay TC2 causes relay TC2 to be de-energized. Relay TC2 is, however, a slow release relay having a slow release period which is less than the off duration of the carrier from the terminal of FIG. 1. Relay TC2 therefor releases after a slow release period.

When relay TC2 releases, its make contact 1 in the secondary energizing path of relay A9 opens so that relay A9 is de-energized. Relay A9 is also a slow release relay and, consequently, does not immediately release when it is de-energized. When relay A9 does release, it does not produce any effects within the system. (Referring to the discussion with respect to the corresponding relay A3 during the consideration of the operation of the terminal of FIG. 1, it will be seen that the purpose of these two relays is to perform a conditioning operation. When such a conditioning operation is performed, it is only performed in one of the terminals with the actual terminal in which it is performed being determined by the direction in which the transmission failure occurs.)

When relay TC2 releases, its make contact 5 in the secondary energizing path of relay A12 opens so that relay A12 is de-energized. Relay A12 is also a slow release relay. The slow release period of this relay is greater than that of relay TC1 of the terminal of FIG. 1. The reason for this will become apparent shortly.

When relay TC2 is released, its make contact 3 in path 4 of the power supply circuit is opened so that the carrier from the terminal of FIG. 2 is turned off, whereas when relay A12 is released its break contact of the early make-break pair EMB2 in path 1 of the power supply is closed so that the carrier from terminal 2 is again turned on. A carrier off-on signal is therefore transmitted towards the terminal of FIG. 1 and, because the temporary failure has cleared at this time, this carrier off-on signal is received by the terminal of FIG. 1.

The carrier off-on signal received at the terminal of FIG. 1 causes relay TF1 to operate and then release. Make contact 5 of relay TF1 in the secondary energizing path of relay TC1 is therefore opened and closed. Relay TC1 is a slow release relay. Its release period is, however, shorter than the period during which contact 5 of relay TF1 is opened. Relay TC1 is therefore released.

When relay TC1 releases, relay A6 is de-energized. Relay A6 is a slow release relay and has a slow release period greater than that of relay TC2.

When relay TC1 releases, its make contact 3 in path 4 of the power supply circuit of FIG. 1 is opened thereby causing the carrier of the terminal of FIG. 1 to be turned off. The release of relay A6 shortly thereafter causes the break contact of early make-break contacts EMB2 of relay A6 to be closed, thereby closing path 1 of the power supply circuit. The terminal of FIG. 1 therefore transmits another carrier off-on signal.

The off-on carrier signal produced by the terminal of FIG. 1 is received by the terminal of FIG. 2 and causes relay TF2 to operate and release. Inasmuch as the time during which relay TF2 is operated is less than two seconds, relay CA2 does not operate and, consequently, nothing else within the control equipment operates.

As each terminal is put back into service when its TC relay releases, the terminals are now available for transmission purposes between telephone system A and telephone system B.

In summary, the action produced in this section results in each terminal producing another carrier interruption and a reconnection of the terminal to service when the output of the receiver-amplifier of the terminal changes from a level other than a normal output level to a normal output level.

TRANSMISSION FAILURE OF A SECOND DURATION

The operation of the disclosed embodiment of the invention will now be described for a shorter term failure, that is one which is greater than two seconds but less than thirty-four seconds. Although it may be helpful to refer to FIG. 3 when considering the following discussion, it should be remembered that FIG. 3 refers to the operation of the embodiment for a much longer failure duration.

*Section 2A*

Because of the thirty second release time of relay CA1, the operation of the terminals during the first thirty-two second is the same as for a long term failure described in Section 1A with the exception that relay TF1 releases during this interval because of the clearance of the failure.

*Section 2B*

When relay CA1 releases after thirty-two seconds, relay A1 also releases which in turn de-energizes relay A4 so this relay releases after its short release period. As a result of this action, path 2 of the power supply circuit of the terminal of FIG. 1 is opened and shortly thereafter path 3 of this circuit is closed, thereby sending an off-on carrier signal toward the terminal of FIG. 2.

Although the terminal of FIG. 2 receives this off-on carrier signal and relay TF2 operates and releases, this all occurs before relay CA2 is released and in view of this no effect is produced at the terminal of FIG. 2. When, however, relay CA2 releases, relay A7 releases and after a short release period relay A10 releases. As a result of this action, path 2 of the terminal of FIG. 2 is opened and, shortly thereafter, path 3 is closed. This causes an off-on carrier signal to be transmitted to the terminal of FIG. 1.

In summary, the action produced in this section results in each terminal producing a momentary interruption in its carrier wave when the output of the terminals' receiver-amplifier approximates a normal output subsequent to thirty seconds after the terminal has been removed from service.

*Section 2C*

The off-on carrier signal received at the terminal of FIG. 1 causes relay TF1 to operate and release. When relay TF1 operates, relay A2 releases and after a short release period relay A5 releases. This results in the opening of path 3 of the power supply circuit of the terminal of FIG. 1 and shortly thereafter the closing of path 4 of this circuit, thereby sending an off-on carrier signal to the terminal of FIG. 2.

The off-on carrier signal received at the terminal of FIG. 2 causes relay TF2 to operate and release. When relay TF2 operates, relay A8 releases and after a short release period greater than that of relay TC1, relay A11 releases. As a result of this action, path 3 of the power supply path of the terminal of FIG. 2 is opened and shortly thereafter path 4 of this circuit is closed, thereby producing an off-on carrier signal which is sent to the terminal of FIG. 1.

In summary, therefore, the action described in this section results in each terminal producing another carrier wave interruption when the output of the receiver-amplifier of the terminal decreases from one level to another level where one of the levels is substantially the previously mentioned predetermined level.

*Section 2D*

The off-on carrier signal received at the terminal of FIG. 1 causes relay TF1 to operate and release. When relay TF1 operates, relay TC1 is de-energized and, because this off-on carrier signal is greater in duration than the release time of relay TC1, relay TC1 releases. This opens path 4 of the power supply circuit of the terminal of FIG. 1 and also de-energizes relay A6. After a short release period relay A6 releases. This in turn closes path 1 of the power supply circuit of the terminal of FIG. 1 and an off-on carrier signal is sent to the terminal of FIG. 2.

At the terminal of FIG. 2, this off-on carrier signal operates and releases relay TF2, which de-energizes relay TC2. Because the off-on carrier signal is greater in duration than the release time of relay TC2, relay TC2 releases.

This opens path 4 of the power supply circuit of the terminal of FIG. 2 and also de-energizes relay A12 which subsequently releases. When relay A12 releases, path 1 of the power supply circuit is again closed and the carrier of the terminal of FIG. 2 is again turned on.

The off-on carrier signal from the terminal of FIG. 2 does not cause anything to occur at the terminal of FIG. 1 other than the operation and release of the relay TF1.

The release of relays TC1 and TC2 reconnects the terminals so that they are once again available for transmission purposes.

As described in this section, each terminal produces another carrier interruption and a reconnection to service in response to the output of its receiver-amplifier changing from a level other than a normal output level to a normal output level.

TRANSMISSION FAILURE OF A THIRD DURATION

Now assume a short term failure that is greater than thirty-four seconds but not sufficiently long for amplifier RA1 to have its gain increased to the point where noise causes carrier rectifier CR1 to produce a normal transmission level type of output.

*Section 3A*

The operation of the terminals for the first thirty-two seconds is the same as for the previously described longer term failure in Section 1A.

*Section 3B*

About thirty seconds after relay CA1 is operated, relay CA1 releases and the primary energizing path of relay A1 is opened. Relay A1, however, is held operated by its secondary energizing path.

About thirty seconds after relay CA2 is operated, it releases which causes relay A7 to release. When relay A7 releases, relay A10 is de-energized and releases shortly thereafter. The release of relay A7 opens path 2 of the power supply circuit of FIG. 1 while the release of relay A10 closes path 3 of this circuit. The carrier off-on signal produced by this action does not get to the terminal of FIG. 2 because of the failure.

When the failure clears, relay TF1 releases thereby opening the secondary energizing path of relay A1. As the gain of amplifier RA1 has increased, relay LF1 releases, thereby closing the tertiary energizing path of relay A1. Relay A1 therefore remains operated. Relay A3 is de-energized when relay LF1 releases and in turn releases after a slow release period. When the gain of amplifier RA1 is readjusted, relay LF1 operates, which causes relay A1 to release. When relay A1 releases, relay A4 releases after a short release period. This action causes path 2 of the power supply circuit of the terminal of FIG. 1 to open and shortly thereafter path 3 of this circuit to close, thus sending a carrier off-on signal to the terminal of FIG. 2.

As described in the section, each terminal produces a momentary interruption in its carrier wave when the output of the terminal's receiver-amplifier approximates a normal output subsequent to thirty seconds after the terminal has been removed from service.

*Section 3C*

The carrier off-on signal produced by the terminal of FIG. 1 is received by the terminal of FIG. 2. This signal causes relay TF2 to operate and release, which in turn causes relay A8 to release and after a short release period relay A11 to release. This action causes path 3 of the power supply circuit of the terminal of FIG. 2 to open and path 4 of this circuit to close, thus sending a carrier off-on signal to the terminal of FIG. 1.

The last carrier off-on signal from the terminal of FIG. 2 is received by the terminal of FIG. 1 and results in relay TF1 operating and releasing. The operation of relay TF1 causes relay A2 to release and after a short release period relay A5 to likewise release. This action results in opening path 3 of the power supply circuit of the terminal of FIG. 1 and then, after a short period, the closing of path 4 of this circuit. The opening of path 3 and the closing of path 4 results in the terminal sending a carrier off-on signal to the terminal of FIG. 2.

The action described in this section results in each terminal producing another carrier wave interruption when the output of the receiver-amplifier of the terminal decreases from one level to another level where one of the levels is substantially the previously mentioned predetermined level.

*Section 3D*

This latest carrier off-on signal is received by the terminal of FIG. 2 and causes relay TF2 to operate and release, which in turn, after a short release period, causes relay TC2 and after another short release period relay A12 to both release. This action causes path 4 of the power supply circuit of the terminal of FIG. 2 to open and, shortly thereafter, path 1 of this circuit to close thus producing a carrier off-on signal which is sent to the terminal of FIG. 1.

At the terminal of FIG. 1, relay TF1 again operates and releases. When relay TF1 operates and releases this time, relay TC1 is de-energized and releases after a short release period while relay A6 is de-energized and releases after a short release period. This action opens path 4 of the power supply circuit and, after a short interval, closes path 1 of this circuit, thus producing a carrier off-on signal which is transmitted to the terminal of FIG. 2.

This latest carrier off-on signal produced by the terminal of FIG. 1 when received by the terminal of FIG. 2 causes relay TF2 to operate and release. The operation and release of this relay at this time, however, does not cause any action to take place in the terminal of FIG. 2. At this time both terminals are back in operation.

As described in this section, each terminal produces another carrier interruption and a reconnection to service in response to the output of its receiver-amplifier changing from a level other than a normal output level to a normal output level.

Transmission failures in the above descriptions of operation were from the terminal of FIG. 2 to the terminal of FIG. 1. It is believed to be apparent that the disclosed embodiment operates similarly for transmission failures from the terminal of FIG. 1 to the terminal of FIG. 2.

The disclosed embodiment also responds to failures that occur simultaneously in both directions of transmission. The modes of operation for such failures are similar to the above-described modes of operation.

Although only one embodiment of the invention has been described in detail, it is to be understood that various other embodiments may be devised by those skilled in the art without departing from the spirit and scope of the invention.

What is claimed is:

1. A carrier wave communication system comprising first and second terminals,
  transmission means interconnecting said terminals, and first and second control means connected to said first and second terminals, respectively, and responsive to carrier frequency currents in their respective receiving channels to disconnect said terminals from service in response to adverse transmission between said terminals, each of said control means producing in order after said terminals are removed from service a first momentary interruption of the carrier wave produced by its terminal in response to carrier frequency currents in the receiving channel of its terminal being substantially at the level of such currents under normal transmission conditions, a second momentary interruption of the carrier wave produced by its terminal in response to said carrier frequency currents in its terminal decreasing from one level to another level where one of the levels is substantially said level under normal transmission conditions, and a third momentary interruption of the carrier wave of its terminal and a reconnection of its terminal to service in response to said carrier frequency currents in its terminal changing from a level other than said level under normal transmission conditions to said level under normal transmission conditions.

2. A carrier wave communication system having first and second terminals, each of said terminals comprising
  means responsive to adverse transmission between said terminals to disconnect the terminal from service and to interrupt for a predetermined interval the carrier wave produced by the terminal,
  means responsive, subsequent to said predetermined interval, to the carrier frequency currents in the receiving channel of the terminal being substantially at the level of such currents under normal transmission conditions to produce a first momentary interruption of the terminal carrier wave,
  means responsive, subsequent to said first momentary interruption, to said carrier frequency currents decreasing from one level to another level where one of these levels is substantially said level under normal transmission conditions to produce a second momentary interruption of the terminal carrier wave, and
  means responsive, subsequent to said second momentary interruption, to said carrier frequency currents changing from a level other than said level under normal transmission conditions to said level under normal transmission conditions to produce a third momentary interruption of the terminal carrier wave and a reconnection of the terminal to service.

3. A carrier wave communication system having first and second terminals and transmission means connected between said terminals, each of said terminals comprising
  means responsive to carrier wave frequency currents in the receiving channel of the terminal deviating from a predetermined level for a first predetermined interval to disconnect the terminal from service and to interrupt for a second predetermined interval the carrier wave produced by the terminal,
  means responsive to said carrier frequency currents being substantially at said predetermined level subsequent to said second predetermined interval to produce a first momentary interruption of the terminal carrier wave,
  means responsive, subsequent to said first momentary carrier wave interruption, to said carrier frequency currents decreasing from one level to another level where one of these levels is substantially said predetermined level to produce a second momentary interruption of the terminal carrier wave, and
  means responsive, subsequent to said second momentary carrier wave interruption, to said carrier frequency currents changing from a level other than said predetermined level to said predetermined level to produce a third momentary carrier wave interruption and a reconnection of the terminal to service.

4. A carrier wave communication system having first and second terminals and transmission means connected between said terminals, each of said terminals comprising
  means responsive to deviations of carrier frequency currents in the receiving channel of the terminal from a predetermined level for a predetermined interval to disconnect the terminal from service and to interrupt for an interval at least equal to said predetermined interval the carrier wave produced by the terminal,
  means responsive subsequent to said predetermined interval to changes in said carrier frequency currents from a level other than said predetermined level to said predetermined level to produce a first momentary interruption of the terminal carrier wave, means responsive subsequent to said first momentary interruption of the terminal carrier wave to changes in said carrier frequency currents from one level to a lower level where one of these levels is substantially said predetermined level to produce a second momentary interruption of the terminal carrier wave, and means responsive subsequent to said second momentary interruption of the terminal carrier wave to changes in said carrier frequency currents from a level other than said predetermined level to said predetermined level to produce a third momentary carrier wave interruption and a reconnection of the terminal to service.

No references cited.